US008117129B2

(12) United States Patent
Saunders et al.

(10) Patent No.: US 8,117,129 B2
(45) Date of Patent: Feb. 14, 2012

(54) SYSTEMS, METHODS AND COMPUTER PROGRAM PRODUCTS FOR PERFORMING MASS TRANSIT MERCHANT TRANSACTIONS (75) Inventors: Peter D. Saunders, Salt Lake CIty, UT (US); Lesley Leggatt, Glendale, AZ (US); I-Hsin Chuang, Brooklyn, NY (US); John J. Oh, Jersey City, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 74 days.

(21) Appl. No.: 12/273,738

(22) Filed: Nov. 19, 2008

(65) Prior Publication Data

US 2009/0164375 A1      Jun. 25, 2009

Related U.S. Application Data (60) Provisional application No. 61/016,069, filed on Dec. 21, 2007.

(51) Int. Cl.
G06Q 40/00 (2006.01)
G06Q 20/00 (2006.01)
G06G 1/12 (2006.01)
(52) U.S. Cl. .......................................... 705/44; 705/21
(58) Field of Classification Search .................... 705/21, 705/44
See application file for complete search history.

(56) References Cited

U.S. PATENT DOCUMENTS

| 5,828,044 | A | 10/1998 | Jun et al. | |
| 5,857,152 | A | 1/1999 | Everett | |
| 6,070,146 | A | 5/2000 | Mimata | |
| 6,732,922 | B2 * | 5/2004 | Lindgren et al. | 235/381 |
| 7,331,522 | B2 | 2/2008 | Sandoval et al. | |
| 7,566,003 | B2 * | 7/2009 | Silbernagl et al. | 235/382 |
| 2002/0194137 | A1 | 12/2002 | Park et al. | |
| 2003/0001755 | A1 | 1/2003 | Tiernay et al. | |
| 2006/0278704 | A1 * | 12/2006 | Saunders et al. | 235/382 |

FOREIGN PATENT DOCUMENTS

WO   WO2006124808   * 11/2006

OTHER PUBLICATIONS

"Performance of a Pilot Test of Contactless Banking Devices on Path and NJ Transit", The Port Authority of NY & NJ, Request for Proposal, Jan. 18, 2007.
"Transit and Contactless Financial Payments: New Opportunities for Collaboration and Convergence", Smart Card Alliance, Oct. 2006.
"Gemalto to Provide 3.5 Million Transit Payment Devices to Massachusetts Bay Transportation Authority", Smart Card Alliance, Mar. 7, 2007.

(Continued)

Primary Examiner — Shahid Merchant
(74) Attorney, Agent, or Firm — Snell & Wilmer L.L.P.

(57) ABSTRACT

Methods, systems and computer program products are provided for enabling access to mass transit systems using a financial transaction instrument including reading an identifier including financial payment information from the financial transaction instrument and determining whether the identifier is stored in a database. Access to a holder of the financial transaction instrument is provided based on the determining.

18 Claims, 10 Drawing Sheets

OTHER PUBLICATIONS

International Search Report and Written Opinion of the International Searching Authority, PCT/US2008/086970, Feb. 6, 2009.

PCT, Int'l Search Report and Written Opinion, PCT/US06/22542 dated Jan. 29, 2008.

USPTO Non-Final Office Action dated Sep. 1, 2009 for U.S. Patent No. 7,731,086.

USPTO Notice of Allowance dated Feb. 2, 2010 for U.S. Patent No. 7,731,086.

Int'l Searching Authority, Int'l Search Report and Written Opinion, PCT/US06/22542 dated Jan. 29, 2008.

USPTO, Non-Final Office Action, U.S. Appl. No. 11/423,388 dated Sep. 1, 2009.

USPTO, Notice of Allowance, U.S. Appl. No. 11/423,388 dated Feb. 2, 2010.

USPTO; Office Action dated Mar. 7, 2011 in U.S. Appl. No. 12/768,900.

USPTO; Notice of Allowance dated May 27, 2011 in U.S. Appl. No. 12/768,900.

PCT; International Preliminary Report on Patentability dated Jun. 22, 2010 in Application No. PCT/US2008/0086970.

* cited by examiner

SYSTEMS, METHODS AND COMPUTER PROGRAM PRODUCTS FOR PERFORMING MASS TRANSIT MERCHANT TRANSACTIONS

CROSS REFERENCE TO RELATED APPLICATIONS

This application claims priority to, and the benefit of, U.S. Provisional Patent Application Ser. No. 61/016,069, filed Dec. 21, 2007, which is hereby incorporated by reference in its entirety.

BACKGROUND

1. Field

Example aspects of the present invention generally relate to mass transit fare collection systems, and more particularly to leveraging such collection systems to utilize financial transaction devices.

2. Related Art

Regular commuters as well as infrequent mass transit riders would like the convenience of not requiring a separate payment device for paying transit fares. Particularly in today's "plastic economy", riders are anxious to use their financial transaction cards, such as credit cards, to make instant fare payments as with any other category of purchase.

Typically, authorization of a financial transaction occurs online which allows a financial transaction card issuer to verify that suitable credit or funds are available before the purchase is completed. Offline authorizations are also used by issuers if they have an intelligent payment device that is able to determine risk and provide authorization to the merchant to approve a purchase transaction. In addition, mass transit operators typically use prepaid financial instruments to allow access through gates and use proprietary technology that is not conventionally used by financial issuers/processors.

BRIEF DESCRIPTION OF THE INVENTION

The present invention provides systems, methods and computer program products for performing mass transit merchant transactions.

In accordance with one embodiment of the present invention, there is provided a system, method and computer program product for enabling access to mass transit systems using a financial transaction instrument, including reading an identifier including financial payment information from the financial transaction instrument and determining whether the identifier is stored in a database. Also included is providing access to a holder of the financial transaction instrument based on the determining.

In accordance with another embodiment of the present invention, there is provided a system, method and computer program product for registering a financial instrument for use at a mass transit agency including requesting a device identifier, translating the device identifier to an alias account number, and associating the alias account number to a mass transit registration account.

In accordance with another embodiment of the present invention, there is provided a system, method and computer program product for processing a request, from a mass transit fare collector, to provide an account status for one or more mass transit registration accounts, including transmitting a status request for the status of mass transit registration accounts to a financial transaction account issuer and/or a financial transaction account processor. The financial transaction account issuer and/or the financial transaction account processor determine a status for each mass transit registration account associated with the status request and the status is stored based on the determination.

In yet another embodiment of the present invention, there is provided a system, method and computer program product for providing an account status for a non-registered user accessing a mass transit system using a financial transaction instrument including requesting a status of an alias account from at least one of a financial transaction account issuer and financial transaction account processor, receiving, from the financial transaction account issuer or processor the status, and storing the status in a table.

Further features and advantages, as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings.

DETAILED DESCRIPTION

The example embodiments of the invention presented herein are directed to systems, methods and computer programs products for performing mass transit merchant transactions, which are now described herein in terms of an example mass transit payment system. This description is not intended to limit the application of the example embodiments presented herein. In fact, after reading the following description, it will be apparent to one skilled in the relevant art(s) how to implement the following example embodiments in alternative embodiments involving any system for providing rapid access in theme park environments, movie theaters, museums, and the like.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for systems, methods and computer program products for performing mass transit merchant transactions.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument (also referred to as a "payment device") may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., a rewards, charge, credit, debit, prepaid, telephone, embossed, smart, magnetic stripe, bar code, transponder or radio frequency card).

The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a fifteen-digit format will generally use sets of four, six, and five numbers, respectively, in the form of:

$$N_1N_2N_3N_4N_5N_6N_7N_8N_9N_{10}N_{11}N_{12}N_{13}N_{14}N_{15}$$

The first five to seven digits are reserved for processing purposes and identify the issuing institution, card type, etc. The last (fifteenth) digit in a fifteen-digit credit card is typically used as a sum check for the fifteen-digit number. The intermediary eight-to-eleven digits are used to uniquely identify the customer, card holder or cardmember.

A visible device identifier ("VID") as used herein refers to an identifier associated with a device. For example, a VID could be an account number embossed on the front of a credit card (e.g., the 15 or 16 digit number described above), a phone number associated with a mobile phone, a number on a fob, a combination of a phone number and an index into a list of multiple payment instruments on the mobile phone, to name a few.

A merchant account number may be, for example, any number or alpha-numeric characters that identifies a particular merchant for purposes of card acceptance, account reconciliation, reporting and the like. It should be noted that the transfer of information in accordance with the present invention, may be done in a format recognizable by a merchant system or account issuer. In that regard, by way of example, the information may be transmitted from an RFID device to an RFID reader, or from the RFID reader to the merchant system in magnetic stripe or multi-track magnetic stripe format.

Generally speaking, the example embodiments described below use "delayed authorization" such as secure static data authentication ("SDA"), combined data authentication ("CDA"), or dynamic data authentication ("DDA"). A delayed authorization is a purchase that completes without any authorization from the issuer or third party transaction processor (for simplicity both the issuer and processor are referred to as "issuer") or the payment device, based on the merchants' assumption that there are enough funds available in the transaction account associated with the payment device for the purchase. At a later time the authorization request is sent to the issuer and the issuer checks for available funds or credit to cover the transaction.

Figure 1:
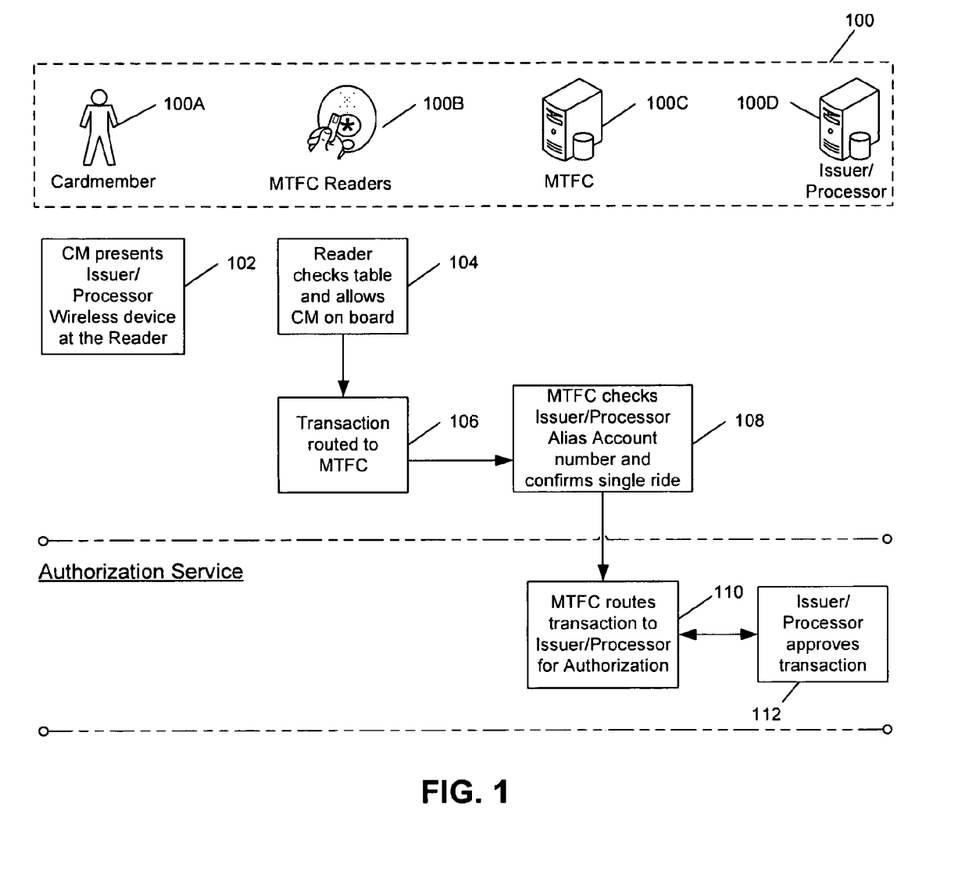
FIG. 1 is an example block diagram showing a system and procedure for approving authorization for a single ride using a financial transaction device.

FIG. 1 is an example block diagram showing a system and procedure for approving authorization for a single ride using a financial transaction device. As shown in FIG. 1, system 100 includes a user 100a (e.g., "cardmember"), mass transit fare collector ("MTFC") readers 100b, an MTFC processor 100c, and an issuer/processor system 100d. In block 102, a cardmember presents the issuer/processor a transaction device (e.g., wireless device such as an expresspay transaction device). In block 104, the MTFC reader 100b queries a database table containing restricted alias accounts to determine whether the cardmember should be authorized to pass through an entry, such as a gate, and hence board a transportation vehicle. In block 106, either concurrently with the initial check performed in block 104 or thereafter, the MTFC reader 100b forms a transaction request and forwards the transaction request to the MTFC processor 100c. In block 108, the MTFC processor 100c makes a determination based on the issuer/processor alias account number whether a single ride was authorized. At block 110, the MTFC processor 100c routes the transaction request (or a derivative thereof) to the issuer/processor to provide authorization services. The issuer/processor system 100c then confirms approval of the transaction, as shown in block 112.

Figure 2:
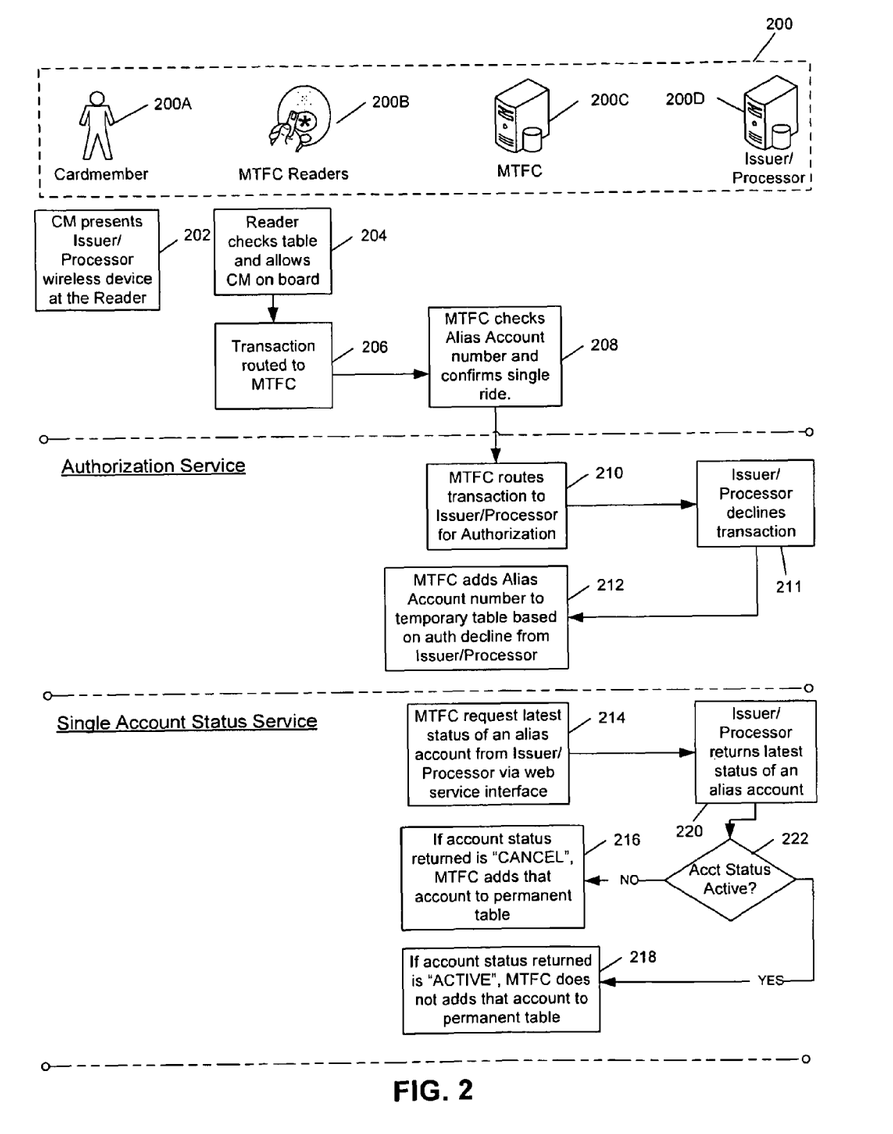
FIG. 2 is an example block diagram showing a system and procedure for declining authorization for a single ride using a financial transaction device.

FIG. 2 is an example block diagram showing a system and procedure for declining authorization for a single ride using a financial transaction device. As shown, system 200 includes a user 200a (e.g., "cardmember"), mass transit fare collector ("MTFC") readers 200b, an MTFC processor 200c, and an issuer/processor system 200d. In block 202, a cardmember presents the issuer/processor a transaction device (e.g., wireless device such as an expresspay transaction device). In block 204, the MTFC reader 200b queries a database table containing restricted alias accounts to determine whether the cardmember should be authorized to pass through an entry, such as a gate, and hence board a transportation vehicle. In block 206, either concurrently with the initial check performed in block 204 or thereafter, the MTFC reader forms a transaction request and forwards the transaction request to the MTFC processor 200c. In block 208, the MTFC processor 200c makes a determination based on the issuer/processor alias account number whether a single ride was authorized. At block 210 the MTFC processor 200c routes the transaction request (or a derivative thereof) to the issuer/processor to provide authorization services. In this example embodiment, the issuer/processor system 200d has declined approval of the transaction, as shown in block 211. Based on the declined transaction, at block 212, the MTFC processor 200c adds the alias account number to a temporary file on a database containing restricted alias accounts.

The MTFC processor 200c, at block 214, requests the latest status of an alias account from the issuer/processor 200d via a web service interface, which in turn provides the MTFC processor 200c status updates. In block 220, the issuer/processor 200d returns the latest status of the alias account. Depending on whether the account is active, the MTFC processor 200c performs different procedures. If a determination is made at block 222 that the account status is not active, then at block 216, the MTFC processor 200c adds the account to a permanent database table containing restricted alias accounts. This can be accomplished, for example, by transmitting a message such as "CANCEL" to the MTFC processor 200c. If at block 222, a determination is made that the account status is active, then the MTFC processor 200c will not add the account to a permanent table containing restricted alias accounts, as shown at block 218. This can be accomplished, for example, by transmitting a message such as "ACTIVE" to the MTFC processor 200c. If the alias account already exists in the temporary file on the database containing restricted alias accounts and the status returned is "ACTIVE", the MTFC processor 200c removes the account from the temporary file.

Figure 3:
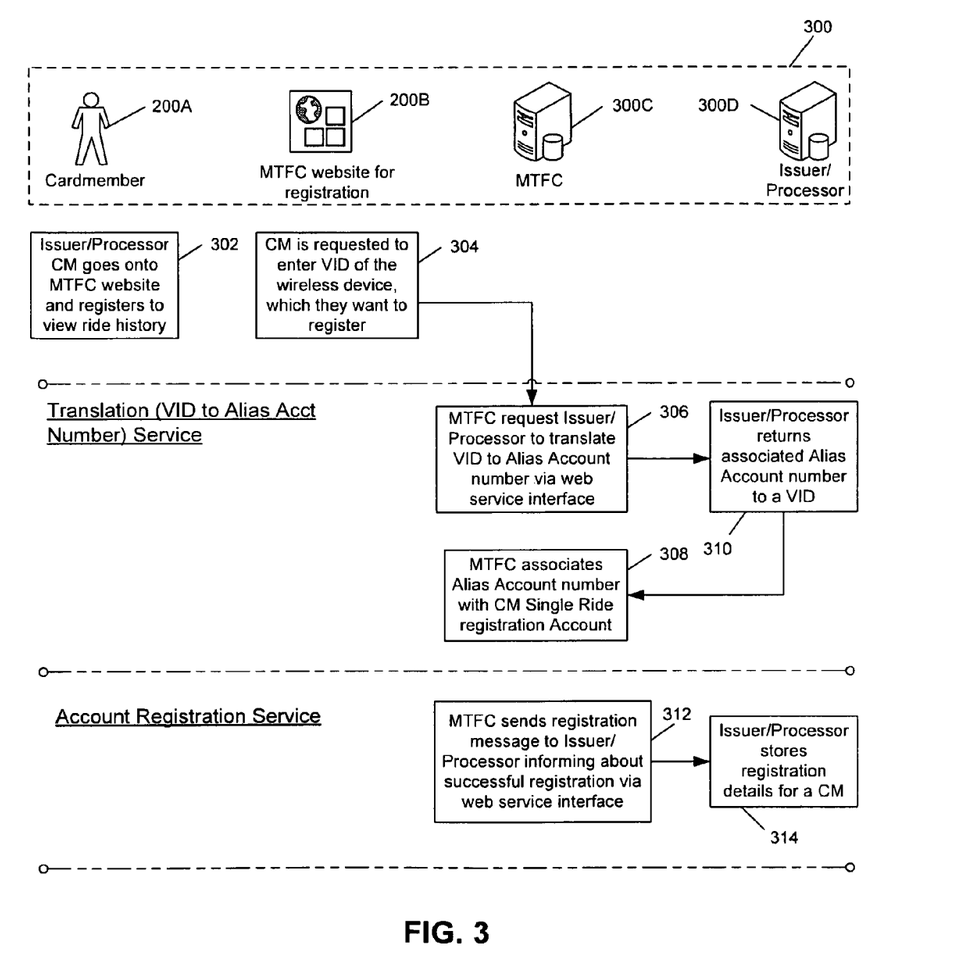
FIG. 3 is an example block diagram showing a system and procedure for registering to view ride history for a single ride.

FIG. 3 is an example block diagram showing a system and procedure for registering to view the ride history for a single ride. As shown, system 300 includes a user 300a (e.g., "cardmember"), a mass transit fare collector ("MTFC") website 300b, an MTFC processor 300c, and an issuer/processor system 300d. At block 302, the cardmember 300a accesses the MTFC website 300b (via an interface, not shown) and registers to view a particular history, such as a single ride history. At block 304, the MTFC website 300b requests the cardmember 300a to enter a payment device identifier or visible device identifier ("VID") of the transaction device (e.g., a wireless device such as an expresspay transaction device) which the cardmember would like to register. Once entered, this information is passed to the MTFC processor 300c, which in turn requests the issuer/processor 300d to translate the VID to an alias account number via the web service interface, as shown in block 306. At block 310, the issuer/processor 300d returns to the MTFC processor 300c the alias account number associated with the VID, which in turn associates the alias account number for the cardmember with a single-ride registration account, as shown in block 308.

At block 312, the MTFC processor 300c sends a registration message to the issuer/processor 300d informing it about whether the registration via the web service interface was successful and provides any necessary details. In turn, issuer/processor 300d stores the registration details associated with the cardmember, as shown in block 314.

Figure 4:
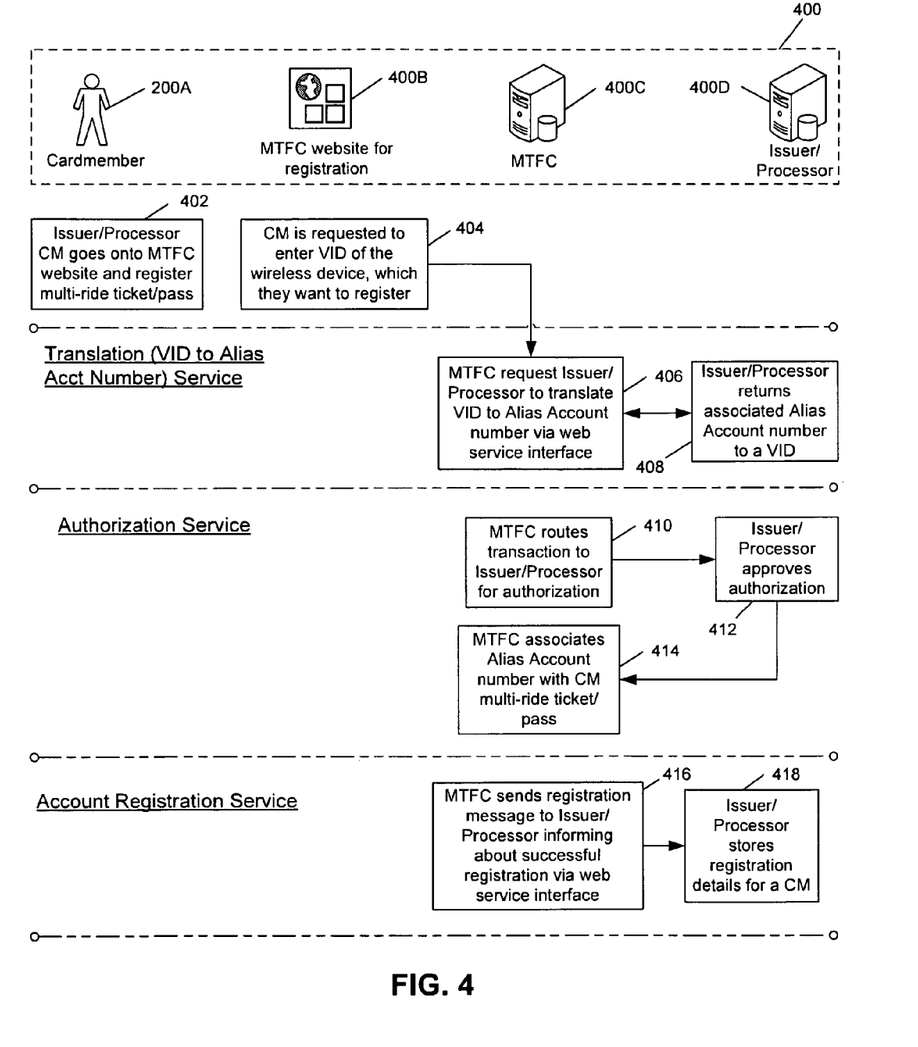
FIG. 4 is an example block diagram showing a system and procedure for registering a cardmember and purchasing a multi-ride ticket/pass using a financial transaction device.

FIG. 4 is an example block diagram showing a system and procedure for registering a cardmember and purchasing a multi-ride ticket/pass using a financial transaction device. As shown, system 400 includes a user 400a (e.g., "cardmember"), mass transit fare collector ("MTFC") website 400b, MTFC processor 400c, and an issuer/processor system 400d. At block 402, the cardmember accesses the MTFC website 400b (via an interface, not shown) and registers to receive multiple rides. At block 404 the cardmember is requested to enter a payment device identifier or visible device identifier ("VID") of a transaction device (e.g., a wireless device such as an expresspay transaction device) which the cardmember wishes to register. The MTFC website 400b forwards the formatted information, and sends it to the MTFC processor 400c which, in turn, requests the issuer/processor system 400d to translate the VID to an alias account number via a web service interface, as shown in block 406. At block 408, issuer/processor 400d returns an associate alias account number to a VID. At block 410, the MTFC processor 400c routes the transaction request (or derivative thereof) to the issuer/processor 400d which, in turn, performs an authorization check, as shown in block 412. If the transaction is authorized, the MTFC processor 400c associates the alias account number with the cardmember's multi-ride ticket/pass, as shown in block 414.

In block 416, the MTFC processor 400c transmits a registration message including some registration details to the issuer/process 400d via the web service interface, informing the issuer/processor 400d whether the registration was successful, and, upon receiving the message, the issuer/processor 400d stores the registration details associated with the cardmember.

Figure 5:
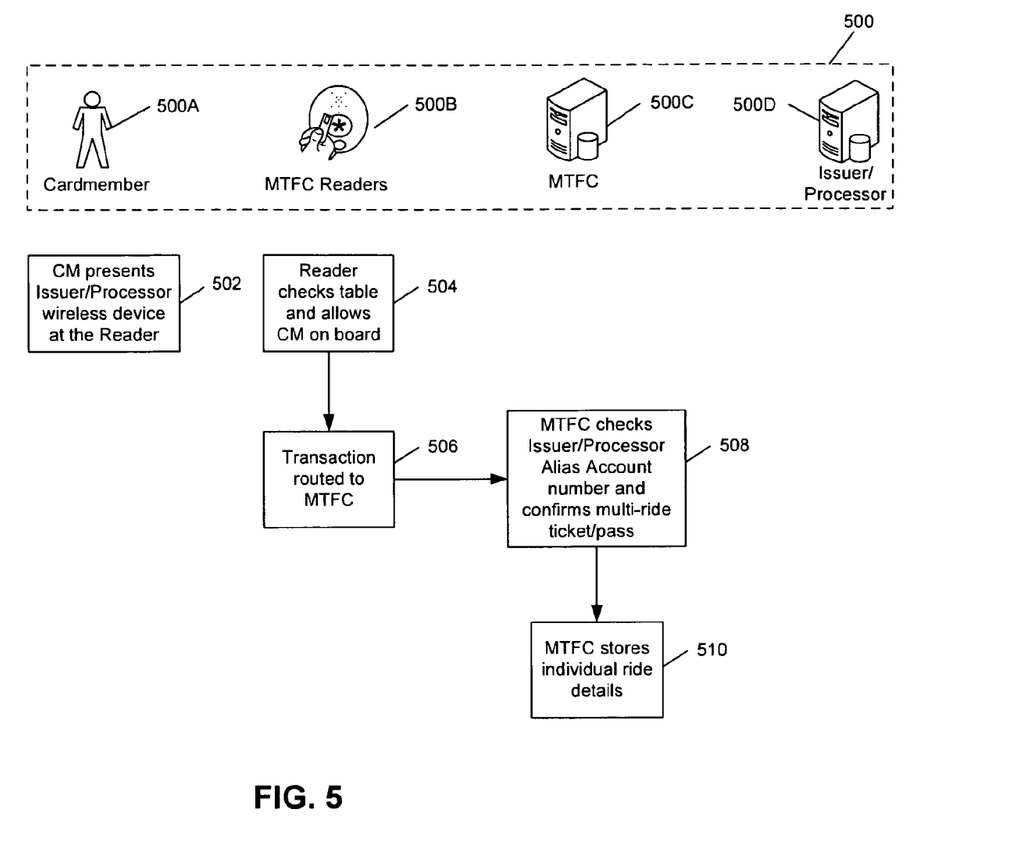
FIG. 5 is an example block diagram showing a system and procedure for approving authorization for a multi-ride ticket/pass using a financial transaction device.

FIG. 5 is an example block diagram showing a system and procedure for approving authorization for a multi-ride ticket/pass using a financial transaction device. As shown in FIG. 5, system 500 includes a user 500a (e.g., "cardmember"), mass transit fare collector ("MTFC") readers 500b, an MTFC processor 500c, and an issuer/processor system 500d. In block 502, a cardmember 110a presents the issuer/processor a transaction device (e.g., wireless device such as expresspay transaction devices). In block 504, the MTFC reader 500b queries a database table containing restricted alias accounts to determine whether the cardmember should be authorized to pass through an entry, such as a gate, and hence board a transportation vehicle. In block 506, either concurrently with the initial check performed in block 504 or thereafter, the MTFC reader forms a transaction request and forwards the transaction request to the MTFC processor 500c. In block 508, the MTFC processor 500c makes a determination based on the issuer/processor alias account number whether that a member's multi-ride ticket/pass was authorized. At block 510 the MTFC processor 500c stores the details for the individual ride for which access was granted.

Figure 6:
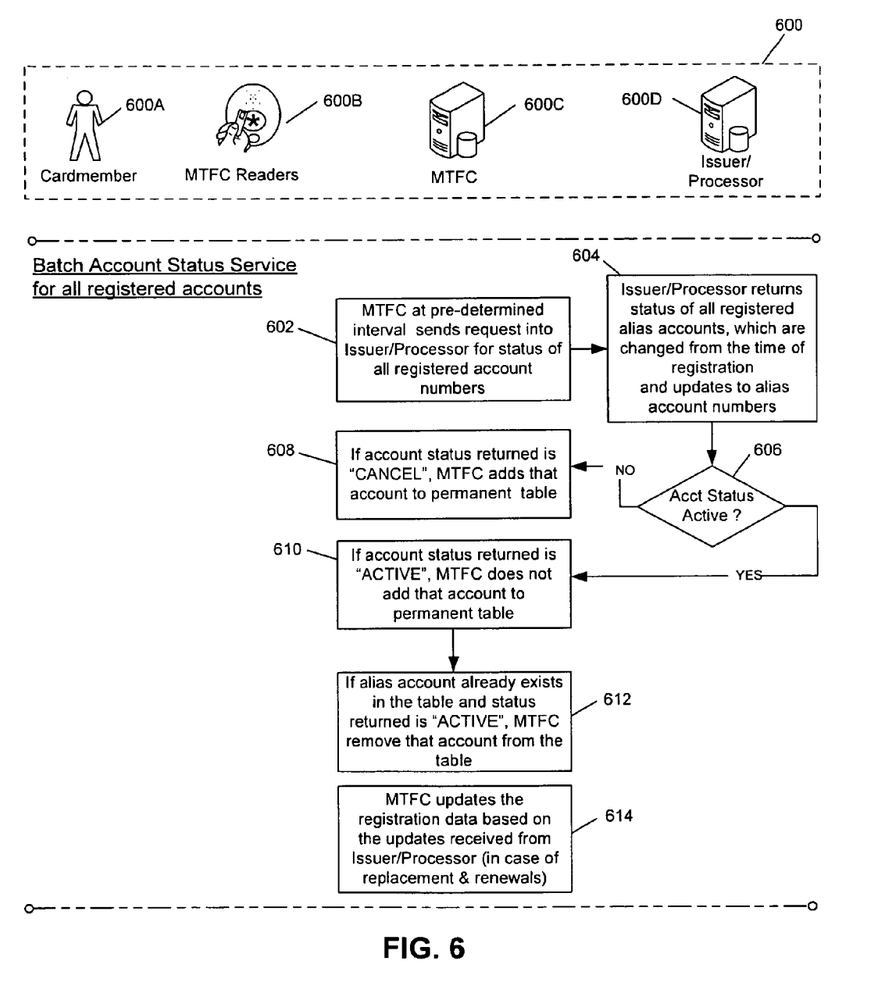
FIG. 6 is an example block diagram showing a system and procedure for authorizing a batch account status request for registered accounts.

FIG. 6 is an example block diagram showing a system and procedure for processing a batch account status request for registered accounts. As shown in FIG. 6, system 600 includes a user 600a (e.g., "cardmember"), mass transit fare collector ("MTFC") readers 600b, an MTFC processor 600c, and an issuer/processor system 600d. With reference to system 600, a batch account status service for all registers account will now be described. In block 602, the MTFC processor 600c, at predetermined intervals, sends a request to the issuer/processor 600d for the status of all registered account numbers. The request can also be transmitted at some other predetermined time, such as upon operator request, at predetermined times, based on server or network usage, and the like. At block 604, the issuer/processor 600d returns the status of all registered alias accounts which have changed from the last time a report was sent and updates the alias account numbers as necessary. As shown at block 606, if a determination is made that an account status is not active, then at block 608 the MTFC processor 600c adds the account to a permanent database table containing restricted alias accounts. This can be accomplished by communicating a message, such as a "CANCEL" message to the MTFC processor 600c.

If a determination is made at block 606, that an account status is active, then a message is sent to the MTFC processor 600c which, in turn, recognizes the message to indicate that the account should not be added to a permanent database table containing restricted alias accounts, as shown at block 610. This can be accomplished by communicating a message, such as an "ACTIVE" message to the MTFC processor 600c. At block 612, if the alias account already exists on the database table containing restricted alias accounts and the status returned is "ACTIVE", the MTFC processor 600c removes the account from the table. If a transaction device has been replaced or renewed, MTFC processor 600c updates the registration data based on the updates received from issuer/processor 600d, as shown at block 614.

Figure 7:
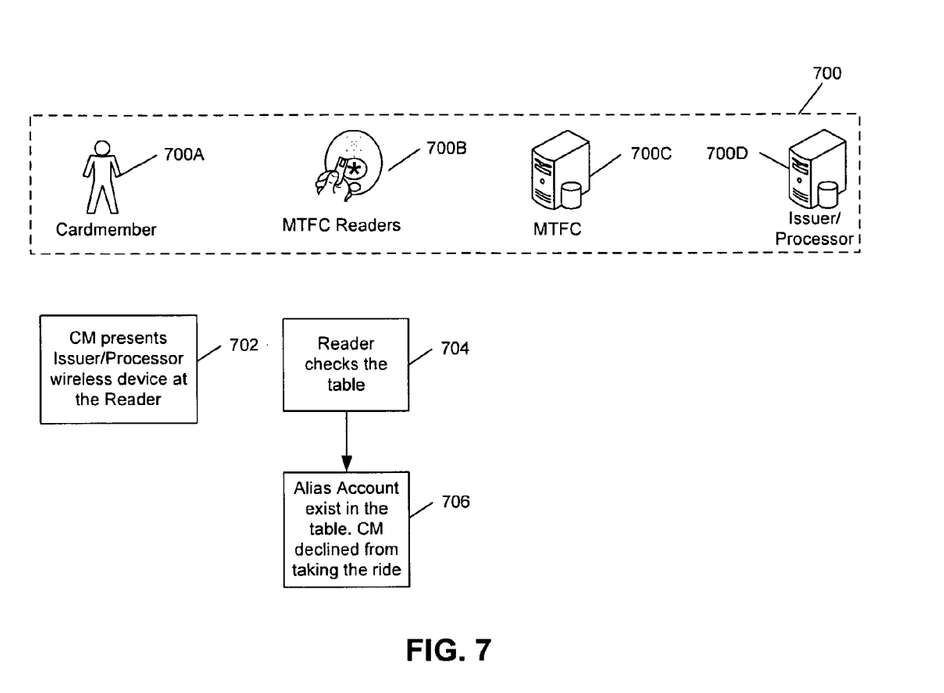
FIG. 7 is a block diagram showing a procedure for determining whether an account number should no longer to be used for riding the transit system.

FIG. 7 is a block diagram showing a system and procedure for determining whether an account number should no longer be used for riding the transit system. As shown in FIG. 7, system 700 includes a user 700a (e.g., "cardmember"), mass transit fare collector ("MTFC") readers 700b, an MTFC processor 700c, and an issuer/processor system 700d. In block 702, a cardmember presents the issuer/processor a transaction device (e.g., wireless device such as an expresspay transaction device). In block 704, the MTFC reader 700b checks a database table containing restricted alias accounts. If an alias account corresponding to the transaction device exists on the database table, then the cardmember 700a is declined from taking the transportation vehicle.

Figure 8:
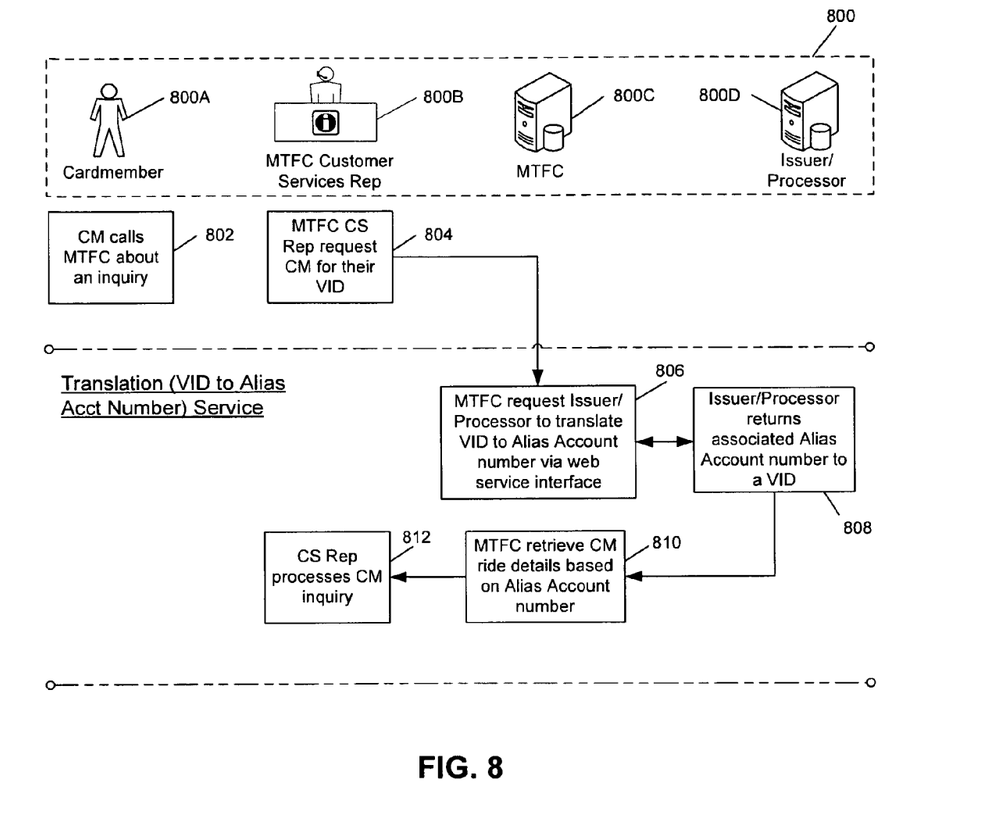
FIG. 8 is a block diagram showing a system and procedure for providing customer servicing.

FIG. 8 is a block diagram showing a system and procedure for providing customer servicing. As shown in FIG. 8, system 800 includes a user 800a (e.g., "cardmember"), a mass transit fare collector ("MTFC") customer service representative 800b, an MTFC processor 800c, and an issuer/processor system 800d. At block 802, a cardmember 800a communicates by, for example, calling the MTFC customer service representative 800b. Upon receiving the communication, MTFC customer service representative 800b requests the cardmember for a payment device identifier or visible device identifier ("VID"). Via a web service interface, the representative then processes the VID by sending it to MTFC processor 800c, which in turn requests the issuer/processor system 800d to translate the VID to an alias account number, as shown at block 806. Issuer/processor 800d returns the associated alias account number to the MTFC processor 800c, as shown in block 808. At block 810, the MTFC processor 800c retrieves the requested cardmember information, such as ride details, based on the alias account number, and provides the information to the MTFC customer service representative 800b who in turn processes the cardmember inquiry, as shown in block 812.

Figure 10:
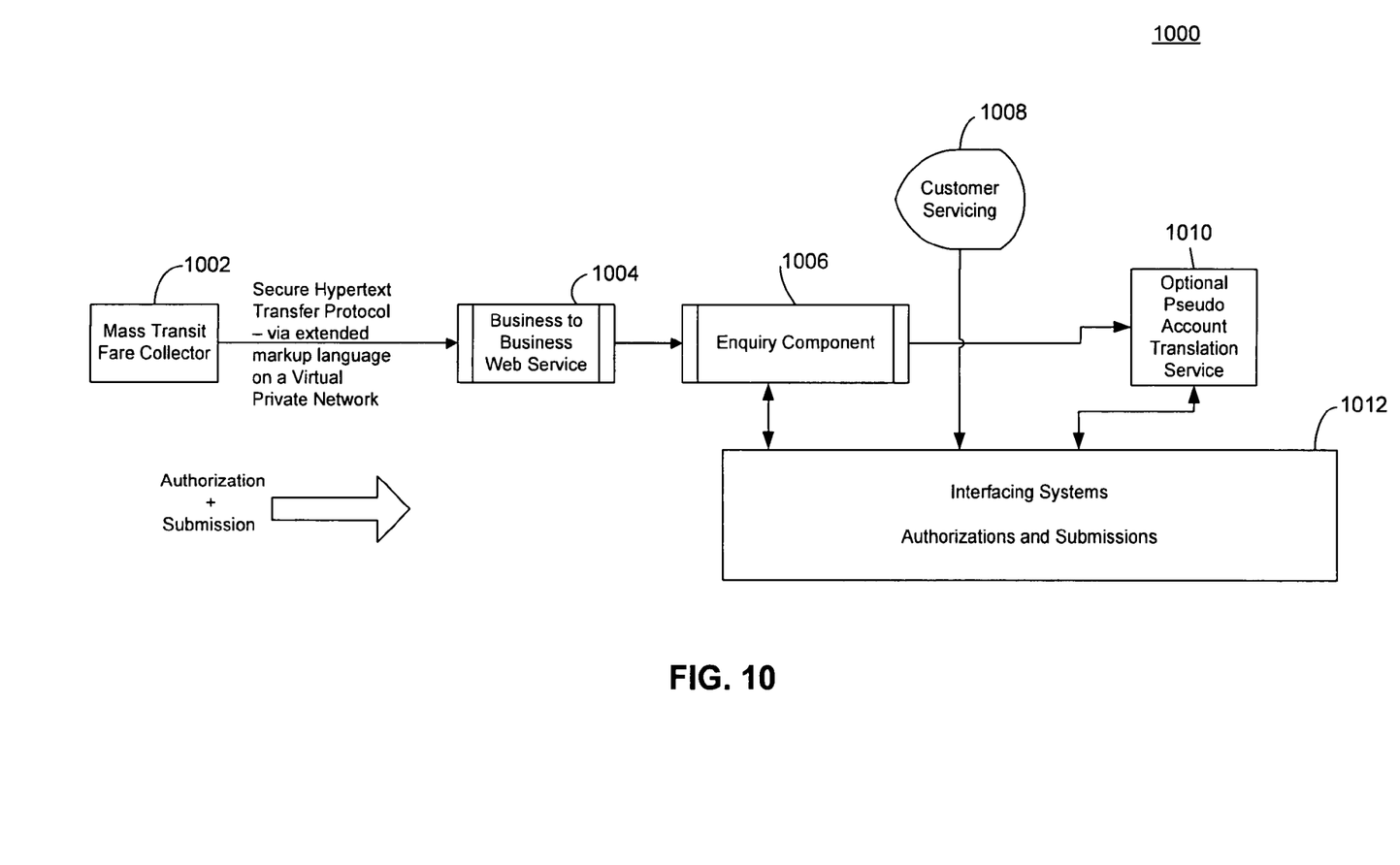
FIG. 10 is a collaboration diagram of functional modules deployed on a computer system for performing mass transit merchant transactions.

FIG. 10 is a collaboration diagram of functional modules deployed on a computer system for performing mass transit merchant transactions. Mass transit fare collector unit 1002 generates authorization and submissions to a business to business web services unit 1004. In one example embodiment, secure hypertext transfer protocol ("HTML") is used to communicate messages. In addition, Extended Markup Language ("XML") can be used as an extension to HTML, both being communicated over a Virtual Private Network. Enquiry component 1006 is a software system at the issuer/processor side that translates the requests received from an MTFC processor into an internal request for account status or for the linkage between the VID and the funding account number. An optional pseudo account translation service unit 1010 is communicatively coupled to both the enquiry component 1006 and one or more interfacing systems 1012.

Interfacing system(s) 1012 are used by the issuer/processor to manage financial transaction accounts, authorize payments and provide settlement of fees. The enquiry component 1006 also is communicatively coupled to the interfacing system(s) 1012 to retrieve the status of the alias account(s). A customer servicing unit 1008 is also communicatively coupled to the interfacing system(s) 1018. Pseudo account translation service unit 1010 provides a linkage between the VID and the alias account number used by the MTFC processor to identify the rider or the payment device holder.

Risk management features will now be described. In one example embodiment, the use of invalid account numbers are reduced by checking that the account number provided is a correct format. For example, a card issuer may issue payment cards with numbers in a specific range and each account number has a Mod 10 check digit. In another example embodiment, risk is reduced by keeping a list of account numbers that have been previously used without sufficient funds. This list can be held by a merchant or some other third party provider. When a delayed authorization is sent to the issuer and it is declined for whatever reason, the merchant can record this number and never allow it to be used again, or at least not be used until the funding/credit issue has been corrected.

In another example embodiment, a merchant can specifically make a request to the issuer to provide a status, such as a "good/no-good" (e.g. active/cancelled), status for an account number if the merchant suspects it is being used fraudulently. This approach allows the issuer to better control the experience of their users and not leave it to the merchant to independently reject a payment device. For example, a financial transaction account instrument holder (referred to sometimes as a "cardmember") with a very large credit limit could be using the card to pay for a train ride and when the delayed authorization request is sent, the issuer may send a decline due to a temporary credit issue. However, the issuer may not want the merchant to prevent that cardmember from using their card again and so would prefer the approach of specifically being able to provide status on the customer as a separate process (outside of the financial network).

In order to reduce per transaction costs individual transactions can be aggregated together and sent in a single authorization request (specifically for an individual cardmember and merchant). In order to keep the security of a card holder's cryptogram the mass transit fare collector ("MTFC") will take the payment data from the last available data image from the transaction device and update the transaction amount with the aggregated amount of the multiple transactions. This has the added benefit of ensuring that the latest application transaction counter ("ATC") values are updated on the issuer side.

Customers can identify themselves using a payment device identifier or visible device identifier ("VID"). Such an identifier, could, for example, be an embossed number on the card, a cell phone number or a Fob ID. These identifiers can also be used for customer servicing for all products. And the embossed number can be used to purchase both in physical merchant locations and also over the phone or via the internet. For independent devices, e.g., expresspay fob or expresspay on mobile devices, cardmembers also can make purchases via the internet using the visible device identifier ("VID").

In an example embodiment, a list of accounts enrolled in monthly or time based program (collectively referred to herein as "multi-ride ticket/pass") is maintained. This list can be used to provide updates on account statuses to merchants. Each account number can be associated with an indication of whether the status of the account has changed since the issuer last provided details to the MTFC processor. Thus, only those accounts which have changed will be communicated. The status changes can also be stored in an audit log, which can be used, for example, for legal purposes or other security or performance related purposes.

The present approach provides the ability to use a payment device, such as a wireless device (e.g., expresspay enabled devices), to provide a transit system with the account number to be used for payment processing. This is accomplished without submitting a request for the account number associated with the payment device.

The above-described example embodiments further reduce risk to the merchant by allowing the merchant to store a list of previously used account numbers that are no longer to be used for riding the transit system. This is driven by declines to previous transactions followed by a good/no good (e.g., active/cancelled) status being provided by the issuer at the request of the transit system.

Aggregated transactions take the payment data from the chip's last available data image and update the transaction amount with aggregated amount of the multiple transactions. The last data image can be signed with a digital signature and contain a cryptogram.

In another example embodiment, an alias account number on the transaction device is used as a link to a multi-ride ticket/pass. This allows the pass to be transferred from one alias account number to another, for example, on a replaced card of the account holder. To manage this, an issuer can maintain a list of multi-ride account numbers and provide status updates to the MTFC processor as requested. This also enables the transit authority to use the alias account number for continuous billing In yet another example embodiment, the cardmember is able to identify themselves to a customer service representative using the visible device identifier ("VID") of the device. The transit authority would then be able to call the issuer via a web interface to get the alias account number to match up to the account in question. This could be used, for example, to inform the cardmember as to how many rides are left on a multi-ride ticket/pass or to allow the cardmember to cancel continuous billing or perform other account management.

The present invention (i.e., systems 100-1000 and the processes depicted in FIGS. 1-8 and 10 or any part(s) or function(s) thereof) may be implemented using hardware, software or a combination thereof and may be implemented in one or more computer systems or other processing systems. However, the manipulations performed by the present invention were often referred to in terms, such as requesting, inquiring or performing customer services, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices. Referring to FIG. 8, for example, the MTFC customer service representative 800*b* could be a processor and related hardware and software configured to provide visual or audible responses to cardmember 800*a* inquiries.

Figure 9:
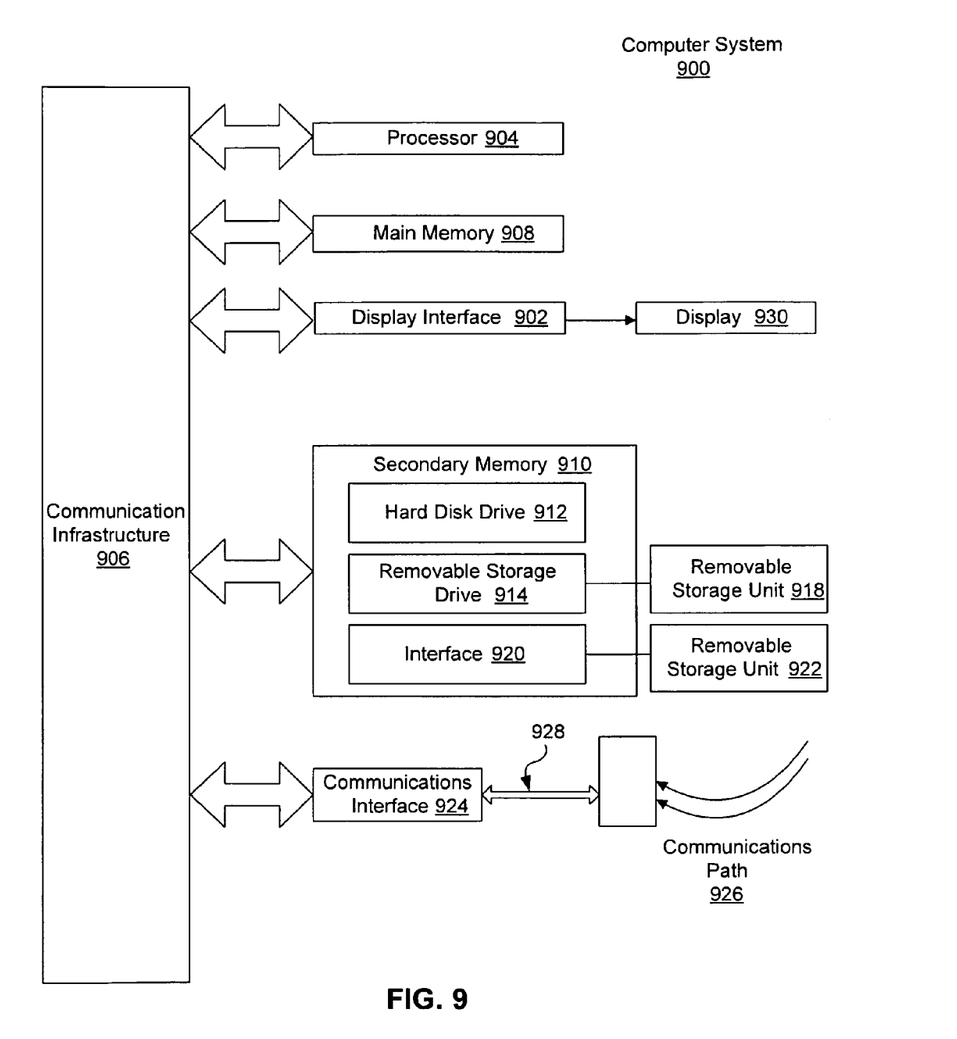
FIG. 9 is a block diagram of an exemplary computer system useful for implementing the present invention.

In fact, in one embodiment, the invention is directed toward one or more computer systems capable of carrying out the functionality described herein. An example of a computer system 900 is shown in FIG. 9.

The computer system 900 includes one or more processors, such as processor 904. The processor 904 is connected to a communication infrastructure 906 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on the display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc. which is read by and written to by removable storage drive 914. As will be appreciated, the removable storage unit 918 includes a computer usable storage medium having stored therein computer software and/or data.

In alternative embodiments, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an electrically erasable programmable read only memory (EEPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928 which may be electronic, electromagnetic, optical or other signals capable of being received by communications interface 924. These signals 928 are provided to communications interface 924 via a communications path (e.g., channel) 926. This channel 926 carries signals 928 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 914, a hard disk installed in hard disk drive 912, and signals 928. These computer program products provide software to computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:
   receiving, at a computer based fare collection system, for a first time, an alias account code, wherein the alias account code is associated with a mass transit registration account, wherein the alias account code is an alias for a transaction account code issued by a transaction account issuer, and wherein the alias account code is translated by the transaction account issuer based upon the transaction account code;
   determining, by the computer based system, a first time, whether the alias account code is in a temporary database table of restricted alias account codes;
   allowing, by the computer based system, access to a mass transit vehicle, in response to the alias account code not being in the temporary database table, prior to obtaining authorization of the alias account code;
   obtaining, by the computer based system, the authorization of the alias account code;
   updating, by the computer based system, the temporary database table by including the alias account code in the temporary database table in response to a ride limit being reached;
   receiving, at the computer based system, for a second time, the alias account code;
   determining, by the computer based system, for the second time whether the alias account code is in the temporary database table of restricted alias account codes;
   denying, by the computer based system, access to the mass transit vehicle, in response to the alias account code being in the temporary database table;
   obtaining, by the computer based system, a status of the alias account code;
   adding, by the computer based system, the alias account code to a permanent database table in response to the alias account code not being active; and
   removing, by the computer based system, the alias account code from the temporary database table in response to the alias account code being active.

2. The method of claim 1, wherein the obtaining the authorization is based on authorization for at least one of a single ride pass or a multi-ride pass.

3. The method of claim 1, wherein the obtaining the authorization is based on confirming that a single ride pass associated with the alias account code, was not previously used.

4. The method of claim 1, wherein the obtaining the authorization is based on confirming that an amount of rides does not exceed a ride limit of a multi-ride pass associated with the alias account code.

5. The method of claim 1, wherein the obtaining the authorization further comprises transmitting an authorization request for a transaction to the transaction account issuer and obtaining authorization from the transaction account issuer for the transaction.

6. The method of claim 1, wherein the obtaining the authorization further comprises transmitting an authorization request for a transaction to the transaction account issuer and obtaining authorization from the transaction account issuer for the transaction, wherein the transaction account issuer translates the alias account code to a transaction account code and confirms that the transaction account code is authorized for the transaction.

7. The method of claim 1, further comprising adding, by the computer based system, the alias account code to the temporary database table of restricted alias account codes, in response to the authorization being rejected.

8. The method of claim 1, further comprising adding, by the computer based system, the alias account code to the temporary database table of restricted alias account codes, in response to a status request resulting in the alias account code being inactive.

9. The method of claim 1, further comprising removing, by the computer based system, the alias account code from the temporary database table of restricted alias account codes, in response to a status request resulting in the alias account code being active.

10. The method of claim 1, further comprising enabling, by the computer based system, viewing of a ride history associated with the alias account code.

11. The method of claim 1, further comprising enabling, by the computer based system, viewing of a ride history associated with the alias account code, wherein the viewing is via a webpage.

12. The method of claim 1, further comprising enabling, by the computer based system, viewing of a ride history associated with the alias account code, in response to registration of the transaction account code associated with the alias account code.

13. The method of claim 1, further comprising requesting, by the computer based system, a status of the alias account code from the transaction account issuer.

14. The method of claim 1, wherein the alias account code is within a limited range of numbers.

15. The method of claim 1, wherein the transaction account code is within a limited range of numbers.

16. The method of claim 1, wherein receiving the alias account code comprises receiving the alias account code from a radio frequency identification (RFID) device.

17. A tangible, non-transitory computer readable storage medium, having stored thereon computer executable instructions that, if executed by a computer based fare collection system, cause the computer based system to perform operations comprising:
- receiving, by the computer based system, for a first time, an alias account code, wherein the alias account code is associated with a mass transit registration account, wherein the alias account code is an alias for a transaction account code issued by a transaction account issuer, and wherein the alias account code is translated by the transaction account issuer based upon the transaction account code;
- determining, by the computer based system, for the first time, whether the alias account code is in a temporary database table of restricted alias account codes;
- allowing, by the computer based system, access to a mass transit vehicle, in response to the alias account code not being in the temporary database table, prior to obtaining authorization of the alias account code;
- obtaining, by the computer based system, the authorization of the alias account code;
- updating, by the computer based system, the temporary database table by including the alias account code in the temporary database table in response to a ride limit being reached;
- receiving, at the computer based system, for a second time, the alias account code;
- determining, by the computer based system, for the second time whether the alias account code is in the temporary database table of restricted alias account codes;
- denying, by the computer based system, access to the mass transit vehicle, in response to the alias account code being in the temporary database table;
- obtaining, by the computer based system, a status of the alias account code;
- adding, by the computer based system, the alias account code to a permanent database table in response to the alias account code not being active; and
- removing, by the computer based system, the alias account code from the temporary database table in response to the alias account code being active.

18. A computer based fare collection system, comprising:
a network interface communicating with a memory;
the memory communicating with a processor for a fare collection system; and
the processor, when executing a computer program, is configured to:
- receive, by the processor, for a first time, an alias account code, wherein the alias account code is associated with a mass transit registration account, wherein the alias account code is an alias for a transaction account code issued by a transaction account issuer, and wherein the alias account code is translated by the transaction account issuer based upon the transaction account code;
- determine, by the processor, for the first time, whether the alias account code is in a database table of restricted alias account codes;
- allow, by the processor, access to a mass transit vehicle, in response to the alias account code not being in the database table, prior to obtaining authorization of the alias account code;
- obtain, by the processor, the authorization of the alias account code;
- update, by the processor, the database table by including the alias account code in the database table in response to a ride limit being reached;
- receive, by the processor, for a second time, the alias account code;
- determine, by the processor, for the second time whether the alias account code is in the database table of restricted alias account codes;
- deny, by the processor, access to the mass transit vehicle, in response to the alias account code being in the database table;
- obtain, by the processor, a status of the alias account code;
- add, by the processor, the alias account code to a permanent database table in response to the alias account code not being active; and
- remove, by the processor, the alias account code from the database table in response to the alias account code being active.

* * * * *